(12) United States Patent
Epshteyn

(10) Patent No.: US 7,409,826 B2
(45) Date of Patent: Aug. 12, 2008

(54) COMPACT HYDROSTATIC ENERGY RECUPERATION SYSTEM AND METHOD OF OPERATION

(76) Inventor: Grigoriy Epshteyn, 804 Rossville Ave., Staten Island, NY (US) 10309

( * ) Notice: Subject to any disclaimer, the term of this patent is extended or adjusted under 35 U.S.C. 154(b) by 0 days.

(21) Appl. No.: 11/216,633

(22) Filed: Aug. 30, 2005

(65) Prior Publication Data

US 2007/0044462 A1    Mar. 1, 2007

(51) Int. Cl.
*F16D 31/02*    (2006.01)
(52) U.S. Cl. .......................................................... 60/414
(58) Field of Classification Search ................... 60/413, 60/414, 419
See application file for complete search history.

(56) References Cited

U.S. PATENT DOCUMENTS

| | | | |
|---|---|---|---|
| 4,779,416 A | 10/1988 | Chatterjea et al. | 60/429 |
| 4,962,825 A | 10/1990 | Albright et al. | 180/292 |
| 5,083,428 A | 1/1992 | Kubomoto et al. | 60/421 |
| 6,170,261 B1 | 1/2001 | Ishizaki et al. | 60/421 |
| 6,370,873 B1 * | 4/2002 | Schaich et al. | 60/413 |
| 6,378,301 B2 * | 4/2002 | Endo et al. | 60/414 |
| 6,434,864 B1 * | 8/2002 | Epshteyn | 37/428 |

* cited by examiner

Primary Examiner—Michael Leslie

(57) ABSTRACT

A compact hydrostatic energy recuperation system comprises hydrostatic converter with first and second pump-motors, which shafts fastened by coupling. The first pump-motor having greater displacement volume associated with the machinery working equipment hydraulic system by hydraulic distributor. The second pump-motor associated with the pneumohydraulic accumulator by two-position valve.

The hydrostatic converter increases the working equipment pump suction oil pressure and the pump specific power.

The hydrostatic converter charges the pneumohydraulic accumulator with boosted oil pressure and smaller oil volume magnitude during the working equipment lowering and considerable decrease the energy recuperation system installation space, weight and cost.

The hydrostatic converter provides the pneumohydraulic accumulator discharge and transmitted this additional energy to the working equipment pump during the most energy consuming load lifting process. This realizes the automatically working energy recuperation system great potentiality of the fuel consumption and toxic exhaust decrease.

9 Claims, 6 Drawing Sheets

COMPACT HYDROSTATIC ENERGY RECUPERATION SYSTEM AND METHOD OF OPERATION

CROSS-REFERENCE TO RELATED APPLICATIONS

Not Applicable

FEDERALLY SPONSORED RESEARCH

Not Applicable

SEQUENCE OF THE INVENTION

Not Applicable

BACKGROUND OF THE INVENTION

1. Field of Invention

The present invention relates to machinery with power fluid systems. More specifically, this invention is a device which would be used in conjunction with construction, agricultural, portable power or other machinery of cycling operations, for instance with a frontal loader, whose main distinguishing feature is a big change of the volume of developed engine power in the process of the working cycle. In this condition the energy recuperation provides minimum fuel consumption and environment—friendly machine.

2. Background of the Invention

The widespread machinery power fluid systems is used to drive working equipment of widely known machinery—mountainous, construction, agricultural, transportation automotive and other heavy equipment.

Power fluid systems are known to consist basically of familiar, expected and obvious structural configurations, notwithstanding a lot of designs encompassed by the crowded prior art which have been developed for the fulfillment of countless objectives and requirements.

By way of example, U.S. Pat. No. 4,779,416 to Chatterjea (1988), U.S. Pat. No. 4,962,825 to Albright at al. (1990), U.S. Pat. No. 5,083,428 to Kubomoto (1992), U.S. Pat. No. 6,170,261 to Ishizaki et al.(2001). U.S. Pat. No. 6,434,864 to the same inventor Epshteyn (2002)

While these devices fulfill their respective, particular objective and requirements, the aforementioned patents do not describe compact hydrostatic energy recuperation system and method of operation for providing increased efficiency and specific power with the minimal installation space, weight and cost.

The machinery with working equipment and energy recuperation system in widespread use suffer from the following known disadvantages:

(a) The machinery working equipment pump charges the pneumohydraulic accumulator (PHA) during the lowering process and whole oil volume goes directly from the working equipment cylinders to the PHA. This requires the PHA volume in several times greater than volume of the working equipment cylinders and decreases the energy recuperation system effectiveness. The PHA has large weight, cost and installation space.

(b) The energy recuperation system during the working equipment lifting defines pump operation in the hydraulic motor mode. This hydraulic motor operates in the pump mode during the working equipment lowering process and requires increased suction oil pressure magnitude. The whole oil volume goes directly from a working equipment cylinders to the PHA during the lowering process impede to provide this requirement.

(c) The working equipment lowering process occurs with large volume oil goes from the tank via pump and cylinders to the PHA charge. This defines the large oil volume change within the tank and requires a greater tank volume with large weight, cost and installation space. This not allows use the conventional machine hydraulic system tank for the energy recuperation system operation.

(d) The oil goes from the working equipment cylinders directly to the PHA has small pressure magnitude and large oil flow instead of use large pressure magnitude and small oil flow. This prevent from use the compact hydrostatic energy recuperation system.

The mentioned disadvantages impede to realize compact and not expensive energy recuperation system, which has great potential to realize the environmentally—friendly machinery with minimum fuel consumption and volume of toxic exhaust.

OBJECTS AND ADVANTAGES

Therefore, it can be appreciated that there exists a continuing need for a new machinery with improved energy recuperation system for providing increased efficiency while minimizing weight, installation space and fuel consumption.

The present invention substantially fulfills these needs.

The objectives and advantages of the present invention are:

(a) to provide the PHA volume decrease by means of a hydrostatic converter, which the PHA charges with increased oil pressure magnitude, thereby decrease weight, cost and installation space of the energy recuperation system.

(b) to provide the working equipment pump-motor operation with the high oil pressure magnitude in the pump inlet during the all modes operation by means of a hydrostatic converter, which enable to increase the pump-motor shaft revolution and the machinery productivity.

(c) to provide minimum changing the oil volume within the hydraulic system tank by means of hydrostatic converter, which allow use the minimum volume tank and decrease the weight, cost and installation space.

(d) to provide a compact and high efficiency energy recuperation system, which the PHA charges with the high oil pressure magnitude and small oil flow by means of hydrostatic converter associated with hydraulic distributor and two-position valve.

SUMMARY OF THE INVENTION

In the view of the foregoing disadvantages inherent in the known types of machinery now present in the prior art, the present invention provides improved machinery, for example, the frontal loader embodiment. As such, the general purpose of the present invention, which will be described subsequently in greater detail, is to provide a new and improved machinery, which has all advantages of the prior art and none of the disadvantages.

To attain this, the present invention essentially comprises a frontal loader comprised of an engine, working equipment, a bucket and a corresponding hydraulic cylinder, a boom, and a corresponding hydraulic cylinder.

The engine has a gear connected thereto. The gear has a first outlet shaft coupled thereto. The frontal loader includes a torque converter having an outlet shaft coupled to loader wheels by a gear box and driving axle. The gear has pair of gear wheels coupled thereto. The gear has a second outlet shaft. The working equipment has a variable displacement pump-motor having a hydraulic servo. The variable displacement pump-motor has a shaft coupled with the second outlet shaft of the gear.

The pump-motor is coupled with the hydraulic cylinders boom lift via a first hydraulic line to a distributor of the boom lift. This distributor has an outlet. The outlet is coupled with the distributor of the bucket turn by a second hydraulic line.

The outlet for the boom lift distributor has supply lines and a check valve coupled with the cylinders. The outlet for the bucket turn distributor has supply lines and a check valve coupled with the cylinder.

The boom lift distributor has control chambers for lifting and lowering. The bucket turn distributor has control chambers for excavating and unloading.

A hydrostatic energy recuperation system comprises hydrostatic converter with first and second pump-motors, which shafts fastened by coupling. The pump-motor housings fixed to bracket and this assembly formed a module. The first pump-motor having greater displacement volume associated with the machinery working equipment hydraulic system by hydraulic distributor. The second pump-motor associated with the pneumohydraulic accumulator by two-position valve.

The hydraulic distributor has a first hydraulic line connected with pump-motor suction line and check valve outlet, the second hydraulic line connected with check valves and third hydraulic line coupled with a hydrostatic converter first pump-motor inlet. The hydraulic distributor has the control chamber.

The hydraulic distributor having two positions: first position, which connected the first line with the third line and the second line is closed; the second position, which connected the second line with the third line and the first line is closed.

The first pump-motor outlet coupled with check valve inlet, with first check valve inlet and coupled with second check valve outlet by hydraulic lines. The hydrostatic converter second pump-motor inlet coupled with hydraulic tank by hydraulic line. The second pump-motor outlet coupled with the third check valve outlet and with first hydraulic line of the two-position valve, which is the two-way valve. This valve second hydraulic line coupled with the pneumohydraulic accumulator.

The two-position valve by first hydraulic control line coupled with working equipment pump-motor outlet and second control line by booster connected with the remote control block hydraulic feeding line.

The working equipment distributors outlet line coupled with the third check valve inlet, coupled by hydraulic line with first check valve outlet and coupled with inlet line of a relief valve, which outlet coupled with the tank.

A remote proportional control block with a control crank is coupled with the excavation control chamber by a pair of lines and with the unloading control chamber by a pair of lines and with the lowering control chamber by a pair of lines and with lifting control chamber by a pair of lines and with the hydraulic servo by lines and valves.

There has thus been outlined, rather broadly, some features of the invention in order that the detailed description thereof that follows may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded is limiting.

As such, those skilled in the art will appreciate that the conception, upon which this disclosure is based, may readily be utilized as a basis for the designing of other structures, methods and system for carrying out the several purposes of the present invention. It is important, therefore, that the claims be regarded as including such equivalent constructions insofar as they do not depart from the spirit and scope of the present invention.

It is therefore an object of the present invention to provide a new and improved energy recuperation system, which has all the advantages of the prior art systems engine-pump and none of the disadvantages.

It is an object of the present invention to provide a decrease in weight and installation space of the machinery working equipment hydraulic energy recuperation system.

It is a further object of the present invention to provide the working equipment pump revolution to increase, thereby to increase the machinery productivity.

An even further object of the present invention is to provide the machinery working equipment with energy recuperation hydraulic system minimum volume tank use.

Lastly it is an object of the present invention to provide a new and improved energy recuperation system for minimizing the fuel consumption, toxic exhaust and to realize the environment—friendly machinery.

In accordance with the present invention the compact energy recuperation system is comprised a frontal loader with an engine, working equipment, a bucket and a corresponding hydraulic cylinder, a boom, and a corresponding hydraulic cylinder.

The engine has a gear connected thereto. The gear has a first outlet shaft coupled thereto. The frontal loader includes a torque converter having an outlet shaft coupled to loader wheels by a gear box and driving axle. The gear has pair of gear wheels coupled thereto. The gear has a second outlet shaft. The working equipment has a variable displacement pump-motor having a hydraulic servo. The variable displacement pump-motor has a shaft coupled with the second outlet shaft of the gear.

The pump-motor is coupled with the hydraulic cylinders boom lift via a first hydraulic line to a distributor of the boom lift. This distributor has an outlet. The outlet is coupled with the distributor of the bucket turn by a second hydraulic line.

The outlet for the boom lift distributor has supply lines and a check valve coupled with the cylinders. The outlet for the bucket turn distributor has supply lines and a check valve coupled with the cylinder.

The boom lift distributor has control chambers for lifting and lowering. The bucket turn distributor has control chambers for excavating and unloading.

A hydrostatic energy recuperation system comprises hydrostatic converter with first and second pump-motors, which shafts fastened by coupling. The pump-motor housings fixed to bracket and this assembly formed a module. The first pump-motor having greater displacement volume associated with the machinery working equipment hydraulic system by hydraulic distributor. The second pump-motor associated with the pneumohydraulic accumulator by two-position valve.

The hydraulic distributor has a first hydraulic line connected with pump-motor suction line and check valve outlet, the second hydraulic line connected with check valves and third hydraulic line coupled with a hydrostatic converter first pump-motor inlet. The hydraulic distributor has the control chamber.

The hydraulic distributor having two positions: first position, which connected the first line with the third line and the second line is closed; the second position, which connected the second line with the third line and the first line is closed.

The first pump-motor outlet coupled with check valve inlet, with first check valve inlet and coupled with second check valve outlet by hydraulic lines. The hydrostatic converter second pump-motor inlet coupled with hydraulic tank by hydraulic line. The second pump-motor outlet coupled with the third check valve outlet and with first hydraulic line of the two-position valve, which is the two-way valve. This valve second hydraulic line coupled with the pneumohydraulic accumulator.

The two-position valve by first hydraulic control line coupled with working equipment pump-motor outlet and second control line by booster connected with the remote control block hydraulic feeding line.

The working equipment distributors outlet line coupled with the third check valve inlet, coupled by hydraulic line with first check valve outlet and coupled with inlet line of a relief valve, which outlet coupled with the tank.

A remote proportional control block with a control crank is coupled with the excavation control chamber by a pair of lines and with the unloading control chamber by a pair of lines and with the lowering control chamber by a pair of lines and with lifting control chamber by a pair of lines and with the hydraulic servo by lines and valves

BRIEF DESCRIPTION OF THE DRAWINGS

The invention will be better understood and objects other than those set forth above will become apparent when consideration is given to the following detailed description thereof. Such description makes reference to the annexed drawings wherein:

DRAWINGS—FIGURES

Figure 1:
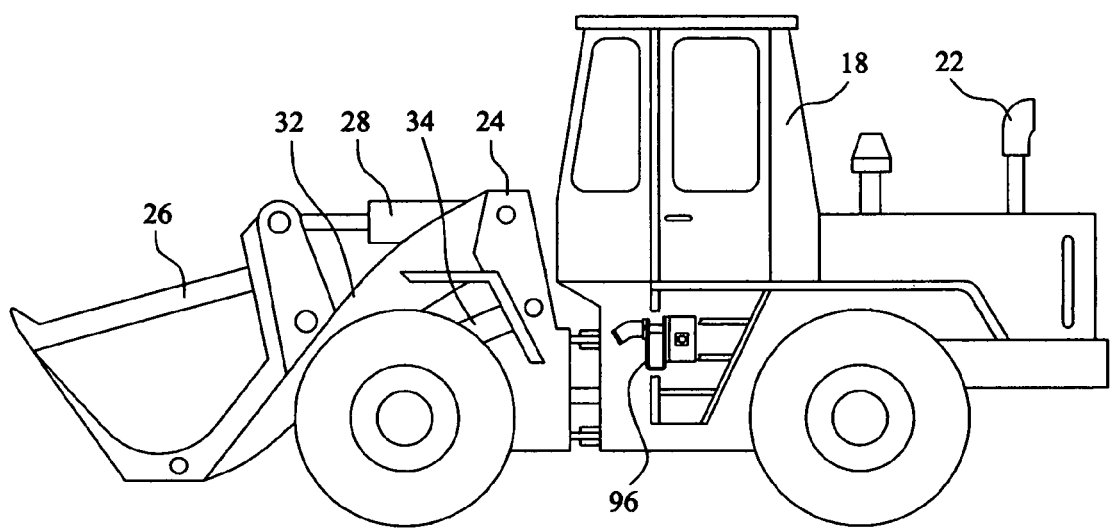
Figure 2:
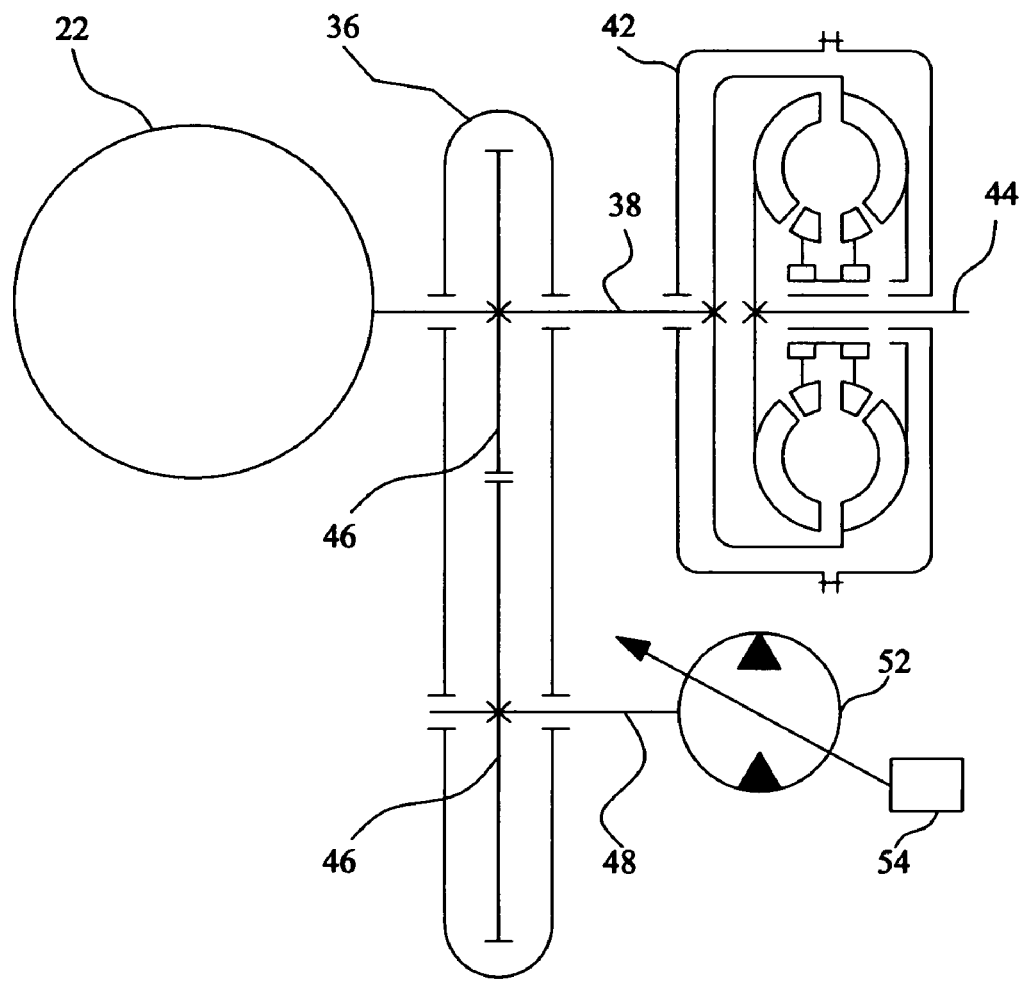
Figure 3:
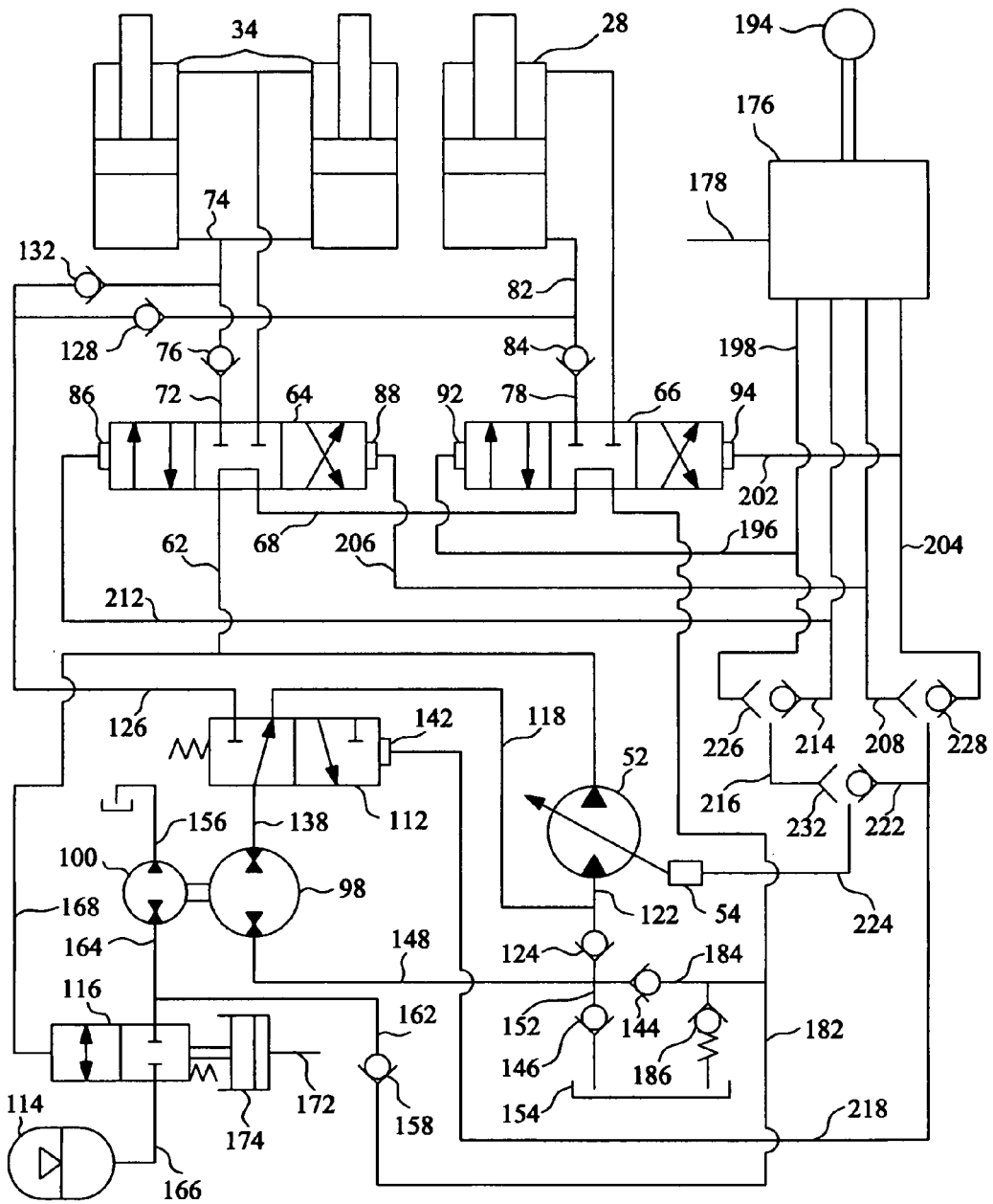
Figure 4:
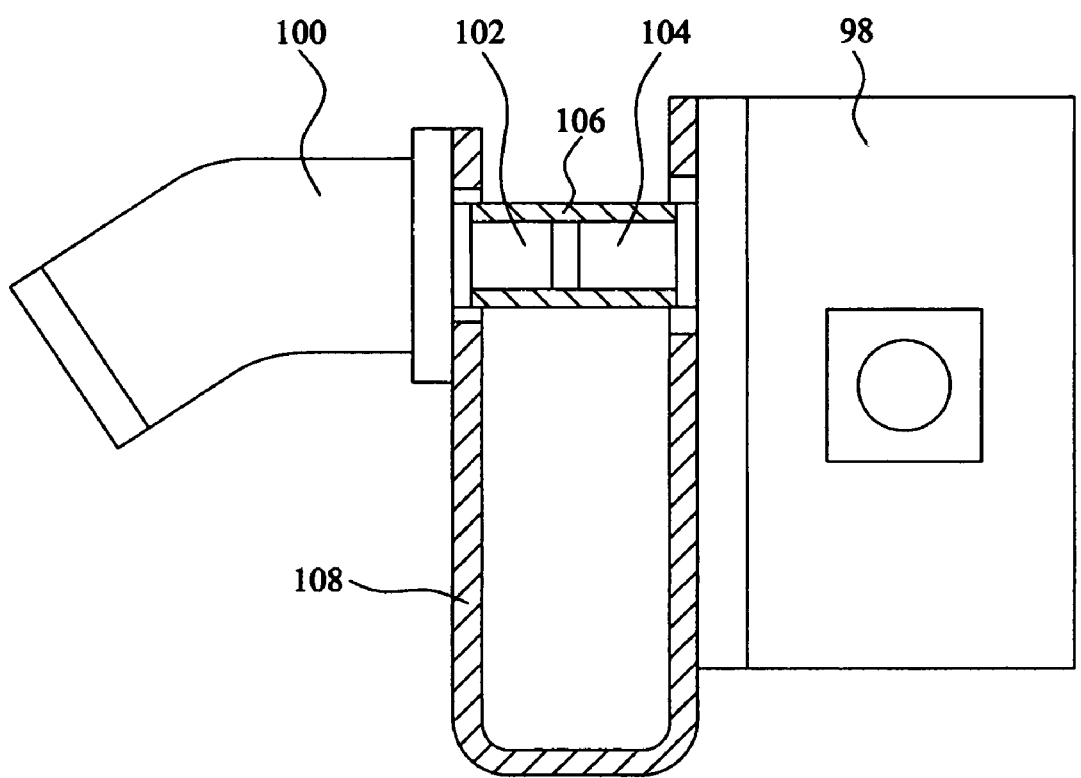
Figure 5:
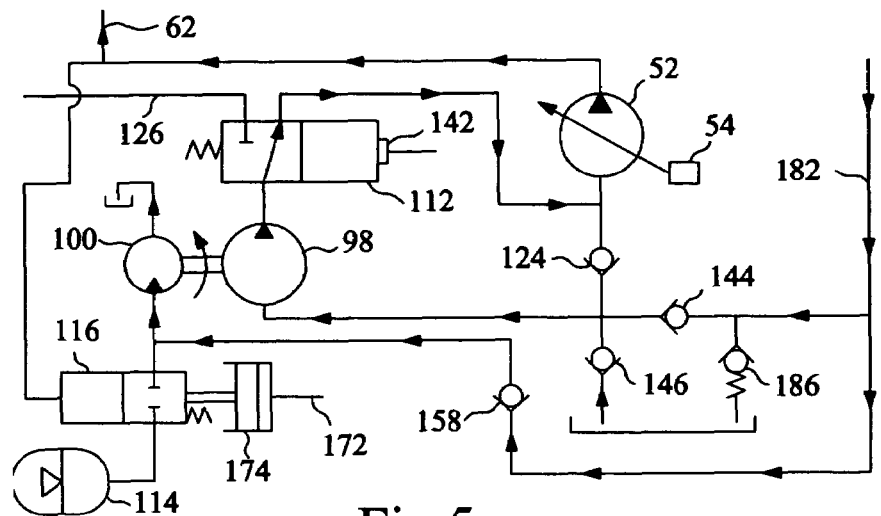
Figure 6:
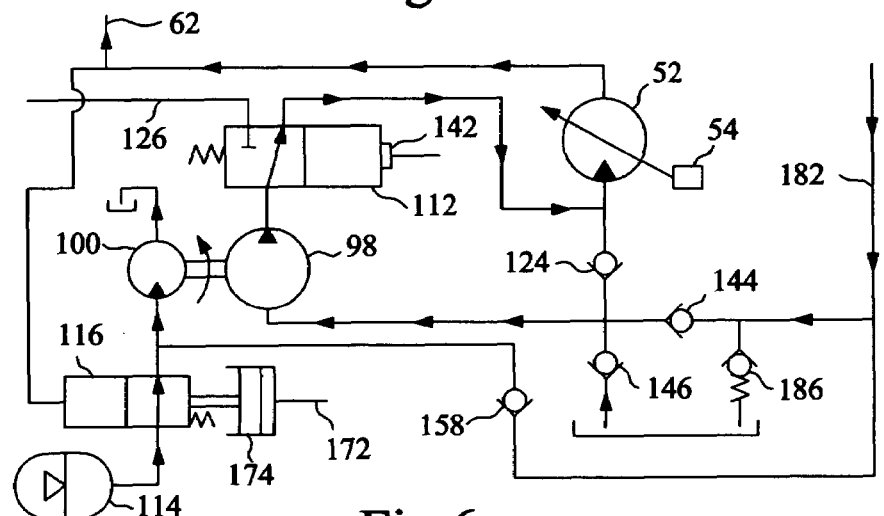
Figure 7:
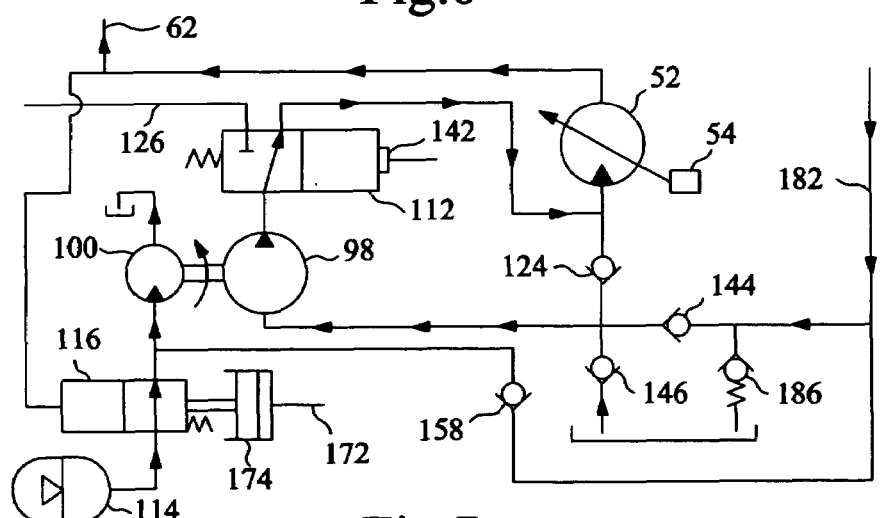
Figure 8:
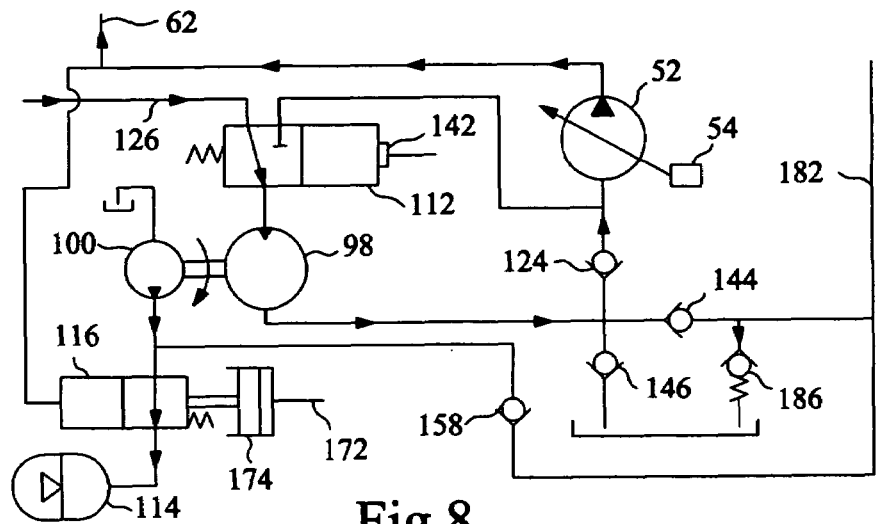
Figure 9:
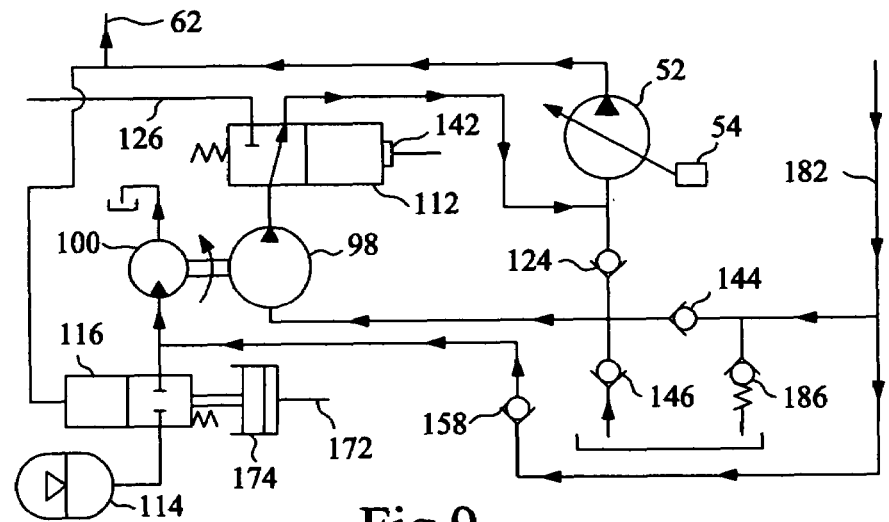
Figure 10:
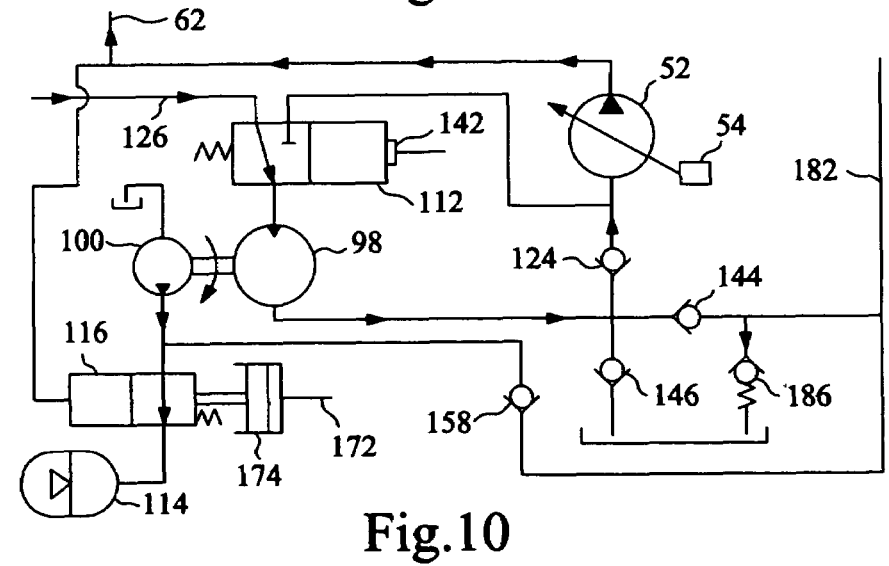

FIG. 1 shows a preferred embodiment (frontal loader) of the compact hydrostatic energy recuperation system in accordance with the principles of the present invention;
FIG. 2 is a kinematical diagram of the present invention;
FIG. 3 is a hydraulic diagram of the present invention;
FIG. 4 shows a hydrostatic converter of the present invention;
FIG. 5 shows an oil flow during idling mode operation of the present invention;
FIG. 6 shows an oil flow during excavation mode operation of the present invention;
FIG. 7 shows an oil flow during lifting mode operation of the present invention;
FIG. 8 shows an oil flow during unloading mode operation of the present invention;
FIG. 9 shows an oil flow during bucket reset mode operation of the present invention;
FIG. 10 shows an oil flow during lowering mode operation of the present invention;
Arrows located on hydraulic lines (FIG. 5-FIG. 10) show the oil flow direction. Arrows located between hydrostatic converter pump-motors (FIG. 5-FIG. 10) show the pump-motor shafts rotation direction.

The same reference numerals refer to the same parts through the various figures.

DRAWINGS—Reference Numerals 18 preferred embodiment (frontal loader)
22 engine
24 working equipment
26 bucket
28 bucket cylinder
32 boom
34 boom cylinders
36 gear
38 gear shaft
42 torque converter
44 torque converter shaft
46 gear wheels
48 gear shaft
52 pump-motor
54 hydraulic servo
62 hydraulic line
64 boom lift distributor
66 bucket turn distributor
68, 72, 74 hydraulic lines
76 check valve
78, 82 hydraulic lines
84 check valve
86, 88, 92, 94 control chambers
96 hydrostatic converter
98 first pump-motor
100 second pump-motor
102, 104 shafts
106 coupling
108 bracket
112 hydraulic distributor
114 pneumohydraulic accumulator
116 two-position valve
118 hydraulic line
122 suction line
124 check valve
126 hydraulic line
128, 132 check valves
138 hydraulic line
142 control chamber
144, 146 check valves
148, 152 hydraulic lines
154 hydraulic tank
156 hydraulic line
158 check valve
162, 164, 166 hydraulic lines
168, 172 hydraulic lines
174 booster
176 remote control block
178 hydraulic feeding line
182, 184 hydraulic lines
186 relief valve
194 control crank
196, 198, 202, 204 hydraulic lines
206, 208, 212, 214 hydraulic lines
216, 218, 222, 224 hydraulic lines
226, 228, 232 valves

DETAILED DESCRIPTION

With reference now to the drawings, and in particular, to FIGS. 1 through 10 thereof, the preferred embodiment of the new and improved machinery hydrostatic energy recuperation system embodying the principles and concepts of the present invention will be described. Specifically, it will be noted in the various Figures that the device relates to a hydrostatic energy recuperation system of machinery, for example, the frontal loader embodiment, for providing increased efficiency while minimizing the installation space, specific weight, fuel consumption and running cost.

To attain this, the present invention comprises a frontal loader 18 (FIG. 1) comprised of an engine 22, working equipment 24, a bucket 26 and a corresponding hydraulic cylinder 28, a boom 32, and a corresponding hydraulic cylinders 34.

The engine 22 has a gear 36 (FIG. 2) connected thereto. The gear 36 has a first outlet shaft 38 coupled thereto. The frontal loader 18 includes a torque converter 42 having an outlet shaft 44 coupled to loader wheels by a gear box and driving axle. (Not illustrated) The gear 36 has pair of gear wheels 46 coupled thereto. The gear 36 has a second outlet shaft 48. The working equipment 24 has a variable displacement pump-motor 52 having a hydraulic servo 54. The variable displacement pump-motor 52 has a shaft coupled with the second outlet shaft 48 of the gear 36.

The pump-motor 52 is coupled with the hydraulic cylinders 34, (FIG. 3) boom lift via hydraulic line 62 to a distributor 64 of the boom lift. The distributor 64 has an outlet. The outlet is coupled with the distributor 66 of the bucket turn by a hydraulic line 68.

The outlet for the boom lift distributor has supply lines 72, 74 and a check valve 76 coupled with the cylinders 34. The outlet for the bucket turn distributor has supply lines 78, 82 and a check valve 84 coupled with the cylinder 28.

The boom lift distributor has control chambers 86, 88 for lifting and lowering. The bucket turn distributor has control chambers 92, 94 for excavating and unloading.

A hydrostatic energy recuperation system comprises hydrostatic converter 96 (FIG. 1) with first and second pump-motors 98, 100, which shafts 102, 104 (FIG. 4) fastened by coupling 106. The pump-motor housings fixed to bracket 108 and this assembly formed a module.

The first pump-motor 98 having greater displacement volume associated with the machinery working equipment hydraulic system by hydraulic distributor 112 (FIG. 3). The second pump-motor 100 associated with the pneumohydraulic accumulator 114 by two-position valve 116.

The hydraulic distributor 112 has a first hydraulic line 118 connected with pump-motor 52 suction line 122 and check valve 124 outlet, the second hydraulic line 126 connected with check valves 128, 132 and third hydraulic line 138 coupled with a hydrostatic converter first pump-motor 98 inlet. The hydraulic distributor has the control chamber 142.

The hydraulic distributor having two positions: first position, which connected the first line with the third line and the second line is closed; the second position, which connected the second line with the third line and the first line is closed.

The first pump-motor 98 outlet coupled with check valve 124 inlet, with first check valve 144 inlet and coupled with second check valve 146 outlet by hydraulic lines 148, 152. The hydrostatic converter second pump-motor 100 inlet coupled with hydraulic tank 154 by hydraulic line 156 and outlet coupled with the third check valve 158 outlet by line 162 and with first hydraulic line 164 of the two-position valve 116, which is the two-way valve. The second hydraulic line 166 of the valve 116 coupled with the pneumohydraulic accumulator 114.

The two-position valve 116 by first hydraulic control line 168 coupled with working equipment pump-motor outlet line 62 and second control line 172 with a booster 174 connected with the remote control block 176 hydraulic feeding line 178. (The connection of lines 172 and 178 not illustrated).

The working equipment distributor 66 outlet line 182 coupled with the third check valve 158 inlet, coupled by hydraulic line 184 with first check valve 144 outlet and coupled with inlet line of a relief valve 186, which outlet coupled with the tank.

A remote proportional control block 176 with a control crank 194 is coupled with the excavation control chamber 92 by a pair of lines 196, 198 and with the unloading control chamber 94 by a pair of lines 202, 204 and with the lowering control chamber 88 by a pair of lines 206, 208 and with lifting control chamber 86 by a pair of lines 212, 214 and with the hydraulic servo 54 by lines 198, 204, 208, 214, 216, 218, 222, 224 and valves 226, 228, 232. The line 218 connected also with chamber 142.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Description of Operation Preferred Embodiment

The engine rotates the gear first and second outlet shafts. The first outlet shaft by means of the torque converter provides the loader movement. The second outlet shaft drives the pump-motor of the working equipment hydraulic system.

Idling Mode. See FIG. 3, FIG. 5

The control block crank 194 neutral position defines the distributors 64, 66 neutral position, the distributor 112 first position and the valve 116 first position. The pump-motor 52 operates in the pump mode, the second pump-motor 100 operates in the motor mode and activates the first pump-motor 98. The oil from the pump 52 goes along lines 62, 68, 182, 162, 164 via check valve 158 to the second pump-motor 100. Because the pump-motor 98 displacement volume greater than the pump-motor 100 displacement volume the pump-motor 98 in the pump mode increase the oil flow magnitude in accordance with the hydrostatic converter ratio and delivers this increased oil flow to the pump-motor 52 suction line. The relief valve 186 provides oil pressure magnitude in the pump 52 suction line enable the pump 52 revolution and specific power to increase.

Excavation Mode. See FIG. 3, FIG. 6

The operator inclines the crank 194 to the excavation position. Control pressure goes along hydraulic lines 196, 198 to the excavation control chamber 92. At the same time, oil from the pump-motor 52 goes along lines 62, 68, 78, 82 via distributor 66 and check valve 84 in rodless chamber and goes out from rod chamber cylinder 28 along hydraulic line 182. The distributor 112 is in first position and the high pressure in hydraulic line 168 switches the valve 116 to the second position. This enables oil movement under pressure from PHA 114 to pump-motor 100, which work in motor mode and activates the first pump-motor 98 in pump mode. The oil flow from the pump 98 goes via distributor 112 to suction line of pump-motor 52, which work in motor mode, transforms accumulated in PHA 114 energy to the work on the shaft of the hydraulic motor 52, which is transmitted along gear wheels 46 (FIG. 2) of gear 36 and which is added to the work of the engine 22.

Thus, energy recuperation takes place and this additional energy goes irrespective of the type of transmission from the engine to machinery wheels. Additional capacity from energy recuperation solves the problem to use smaller capacity engine than a serial machinery and same productivity in the most energy consuming operation—process of excavation without overloading this (smaller) engine with decrease of fuel consumption and volume of toxic exhaust.

In the process of excavation, the operator controls by crank 194, the volume of working of the variable displacement pump-motor 52, since oil pressure in the hydraulic servo 54 corresponds to the pressure in hydraulic lines 198, 216, 224 with the help of valves 226, 232. This enables the changing of the bucket turn speed of the loader by displacement and without trotting control in the distributor 66 turns a bucket, which also decreases fuel consumption. This method, without throttle control, uses in the all modes operation.

Lifting Mode. See FIG. 3, FIG. 7

After finishing the excavation process, the operator inclines the crank 194 to the lift position and control pressure goes along hydraulic lines 212, 214 to the control chamber 86. At the same time, oil from the pump-motor 52 goes along lines 62, 72, 74 via distributor 64 and check valve 76 to rodless chambers and goes out from rod chambers cylinders 34 along hydraulic lines 68, 182. The distributor 112 is in first position and the high pressure in hydraulic line 168 switches the valve 116 to the second position. This enables oil movement under pressure from PHA 114 to pump-motor 100, which work in motor mode and activates the first pump-motor 98 in pump mode. The oil flow from the pump 98 goes to suction line of pump-motor 52, which work in hydraulic motor mode. PHA transmits accumulated energy to the hydraulic motor 52 in such a way as when excavating.

Thus, additional capacity from energy recuperation solves the problem to use smaller capacity engine than a serial machinery and same productivity in the most energy consuming operation—process of loaded bucket lifting, without overloading this (smaller) engine with decrease in the fuel consumption and volume of toxic exhaust.

Unloading Mode. See FIG. 3, FIG. 8

After finishing the lifting process, the operator inclines the crank 194 to the unloading position for unloading of material from the bucket. The control pressure goes along hydraulic lines 202, 204 to the chamber 94 and switches the distributor 66 to the unloading position; also control pressure goes via valve 228 and hydraulic line 218 to the control chamber 142 and switches the distributor 112 to the second position, simultaneously control pressure goes along hydraulic lines 204, 218, 222, 224 and via valves 228, 232 to the hydraulic servo 54. The high pressure in hydraulic line 168 switches the valve 116 to the second position.

At the same time, oil from the pump-motor 52, which work in pump mode, goes along lines 62, 68 via distributor 66 to rod chamber and goes out from rodless chamber cylinder 28 along hydraulic lines 82, 126 via check valve 128 and distributor 112. From the distributor 112 oil goes along line 138 to the pump-motor 98, which work in motor mode and activates the pump-motor 100. The pump-motor 100 in the pump mode delivers oil to the PHA 114 along lines 164, 166 via valve 116 and increase the oil pressure magnitude and simultaneously decrease the oil flow magnitude in accordance with the hydrostatic converter ratio.

So occurs the PHA charge with small oil volume magnitude. This PHA energy consists of power delivery to pump 52 from engine and potential energy of material in bucket. Engine is loaded with additional power, necessary for pump 52, in the least power consuming part of working cycle—unloading.

At the same time, oil from the pump-motor 98 goes along line 148 via check valve 124 to suction line pump-motor 52, which work in pump mode. The relief valve 186 provides oil pressure magnitude in the pump 52 suction line enable the pump 52 revolution and specific power to increase. So the pump 52 receives the oil (from the cylinder via the hydrostatic converter first pump-motor) with small oil volume change within the hydraulic tank.

Thus, the hydrostatic converter delivers the necessary oil pressure to the working equipment pump suction line, provides the minimum tank volume use and simultaneously decreases the PHA volume in accordance with the hydrostatic converter pump-motors displacement ratio.

Bucket Reset Mode. See FIG. 3, FIG. 9

After finishing the unloading process, the operator inclines the crank 194 to the excavation position and similar to excavation the control oil pressure goes to chamber 92. This pressure in hydraulic line 168 during bucket reset is not enough to change valve 116 position because bucket is empty. The valve 116 remained in first position and the accumulated energy in PHA from unloading is preserved during bucket reset.

The pump-motor 52 operates in the pump mode. The oil from the pump 52 goes to the cylinder 28 along lines 62, 68, 78, 82 via valve 84 to the cylinder 28 and along line 182 via check valve 158 to the pump-motor 100 The second pump-motor 100 operates in the motor mode and activates the first pump-motor 98. Because the pump-motor 98 displacement volume greater than displacement volume of the pump-motor 100 the pump-motor 98 in the pump mode increase the oil flow magnitude in accordance with the hydrostatic converter ratio and delivers this increased oil flow to pump 52 suction line. The relief valve 186 provides oil pressure magnitude in the pump 52 suction line enable the pump 52 revolution to increase.

Lowering the Boom Mode. See FIG. 3, FIG. 10

Operator inclines the crank 194 to the lowering position. The control pressure goes along hydraulic lines 206, 208 to the chamber 88 and switches the distributor 64 to the lowering position. Simultaneously oil goes via valve 228 and hydraulic line 218 to the control chamber 142 and switches the distributor 112 to the second position. At the same time control pressure goes along hydraulic lines 222, 224 and via valve 232 to the hydraulic servo 54. The high pressure in hydraulic line 168 switches the valve 116 to the second position. Simultaneously oil from the pump-motor 52, which work in pump mode, goes along line 62 via distributor 64 to rod chambers and goes out from rodless chambers cylinders 34 along hydraulic lines 74, 126 via check valve 132 and distributor 112. From the distributor 112 oil goes along line 138 to the pump-motor 98, which work in motor mode and activates the pump-motor 100. The pump-motor 100 in the pump mode delivers oil along lines 164, 166 via valve 116 to the PHA 114 and increase the oil pressure magnitude and simultaneously decrease the oil flow magnitude in accordance with the hydrostatic converter ratio.

The PHA charge occurs with small oil volume magnitude. This PHA energy consists of power delivery to pump 52 from engine and potential energy of lifted working equipment. Engine is loaded with additional power, necessary for pump 52, in the least power consuming part of working cycle—unloading. At the same time, oil from the pump-motor 98 goes along line 148 via check valve 124 to suction line pump-motor 52, which work in pump mode. The relief valve 186 provides oil pressure magnitude in the pump 52 suction line enable the pump 52 revolution and specific power to increase.

The hydrostatic converter pump-motors chambers associated with the tank independently of the mode operation. This enable to use widely available and inexpensive standard pumps in capacity of hydrostatic converter pump-motors, which the shafts rotates in one direction during the pneumohydraulic accumulator charge and this shafts rotates in opposite direction during the pneumohydraulic accumulator discharge.

Thus, the hydrostatic converter delivers the necessary oil pressure to the working equipment pump suction line, provides the minimum tank volume use and simultaneously decreases the PHA volume in accordance with the hydrostatic converter pump-motors displacement ratio.

The energy recuperation solves the problem to use smaller capacity engine than a serial machinery and same productivity in the most energy consuming operation—process of excavation and loaded bucket lifting. The smaller capacity engine is a first factor of the fuel saving.

The engine is loaded with additional power, necessary for pump in the least power consuming parts of working cycle—unloading and lowering the working equipment and the engine load during the working cycle become more uniform. The uniformed engine load is the second factor of the fuel saving.

The energy recuperation uses the potential energy of lifted working equipment for the pneumohydraulic accumulator charge and this is the third factor of the fuel saving.

The working equipment control without oil trotting in the all modes operation is the additional factor of the fuel saving.

So all mentioned factors enable us to decrease the fuel consumption at least of 30% and to realize environment—friendly machinery thanks to compact energy recuperation system, which operates automatically.

What is claimed as being new and desired to be protected by Letters Patent of the United States is as follows:

1. A compact hydrostatic energy recuperation system, comprising a pneumohydraulic accumulator, a hydraulic distributor and two-position valve associated with a machinery working equipment hydraulic system including cylinders with lifting chambers coupled with check valves, distributors with hydraulic outlet line and inlet line coupled with pump having suction line with a check valve, remote control block with feeding line, hydrostatic converter comprising first greater and second smaller pump-motor hydraulicly associated respectively with pneumohydraulic accumulator and said suction line of said pump.

2. The system of claim 1 wherein said hydraulic distributor comprising three hydraulic lines comprising a first line connected with said pump suction line, a second line connected with said check valves and third hydraulic line coupled with said hydrostatic converter first pump-motor inlet.

3. The system of claim 2 wherein said hydraulic distributor comprising two positions: first position, which connected said first line with said third line and said second line is closed; a second position, which connected said second line with said third line and said first line is closed.

4. The system of claim 1 wherein said hydrostatic converter first pump-motor outlet is hydraulicly coupled with said suction line check valve inlet, connected with a first check valve inlet and coupled with second check valve outlet, which inlet hydraulicly coupled with said tank.

5. The system of claim 1 wherein said hydrostatic converter second pump-motor inlet is hydraulicly coupled with said tank, the outlet coupled with a third check valve outlet and simultaneously coupled with a first hydraulic line of said two-position valve.

6. The system of claim 1 wherein said two-position valve is a two-way valve, coupled by means of a second hydraulic line with said pneumohydraulic accumulator and in the first position the first and second hydraulic lines are disconnected and in the second position the first and second hydraulic lines are connected.

7. The system of claim 1 wherein said two-position valve having two hydraulic lines including first control line coupled with said working equipment pump-motor outlet and a second control line coupled by means of booster with said remote control block hydraulic feeding line.

8. The system of claim 1 wherein said working equipment distributors outlet line coupled with first check valve outlet, coupled with third check valve inlet and coupled with inlet line of a relief valve, which outlet line coupled with said tank.

9. A method of energy recuperation system operation comprising the steps of:
(a) decreasing the pneumohydraulic accumulator volume by hydrostatic converter, which first pump-motor receives oil flow from working equipment cylinders during the lowering or unloading process, activates a second smaller displacement volume pump-motor and charges the pneumohydraulic accumulator with boosted oil pressure magnitude in accordance with the hydrostatic converter pump-motors displacement volume ratio, and (b) providing the energy recuperation by means of hydrostatic converter, which second pump-motor in the motor mode receives oil flow directly from the pneumohydraulic accumulator during discharge and activates the first pump-motor, which in the pump-mode transmits the additional energy to a working equipment pump-motor suction line during the lifting or excavation process, and
(c) increasing the machinery working equipment pump specific power by hydrostatic converter, which second pump-motor in the motor mode activates the greater displacement volume first pump-motor in the pump mode and feeds the working equipment pump suction line with the oil pressure necessary for increase the working equipment pump-motor shaft revolution.

* * * * *